April 11, 1950 A. H. BECKER 2,503,992
INNER TUBE TESTER
Filed June 20, 1947 2 Sheets-Sheet 1
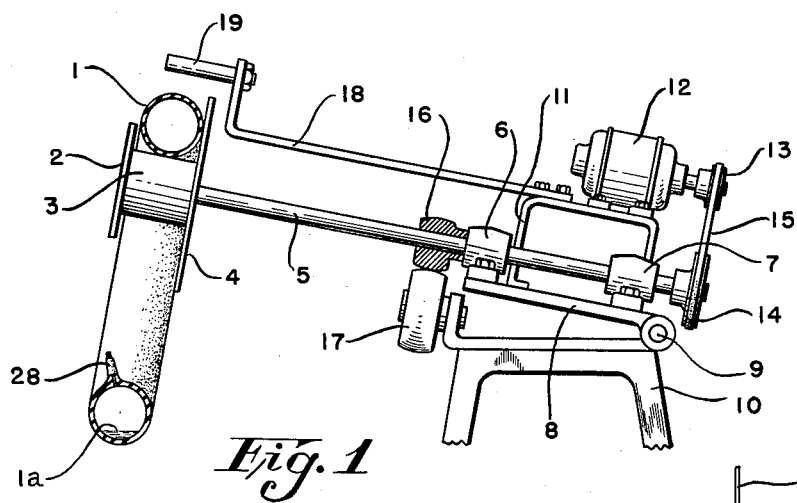
Fig. 1
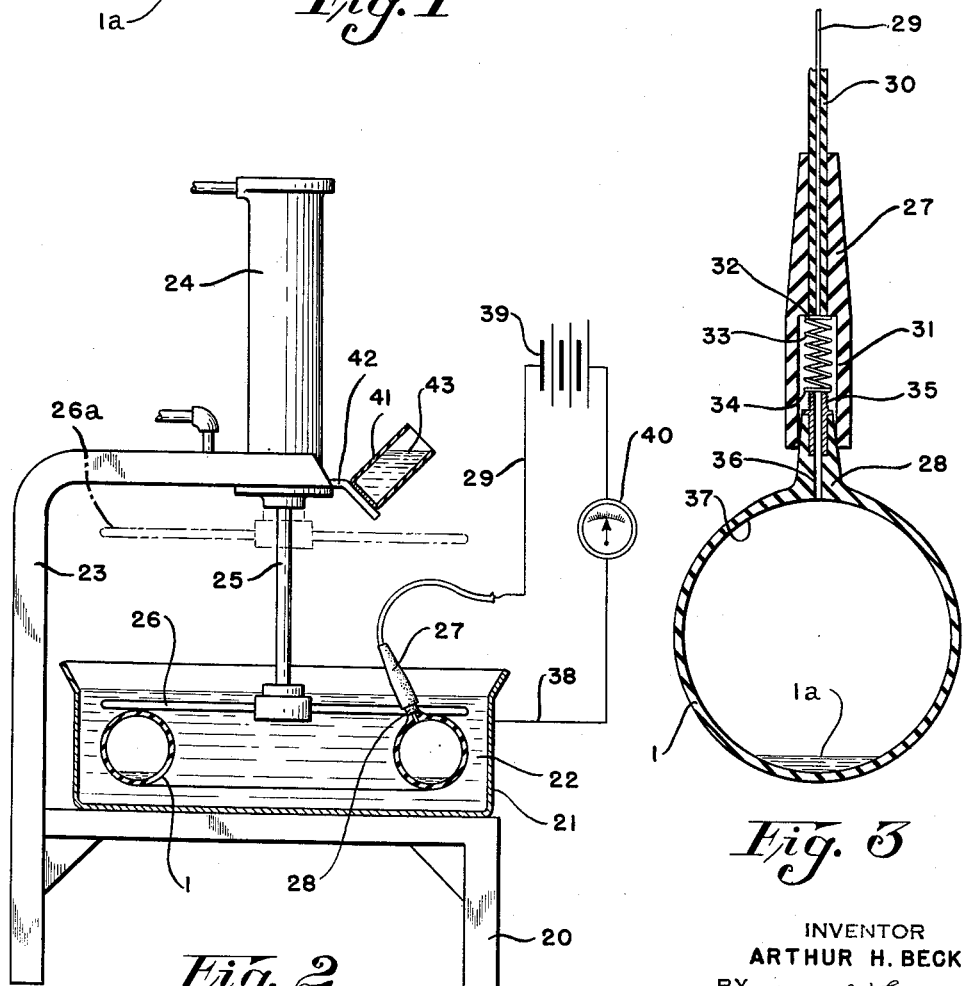
Fig. 2
Fig. 3
INVENTOR
ARTHUR H. BECKER
BY Henry P. Truesdell
ATTORNEY April 11, 1950        A. H. BECKER        2,503,992

INNER TUBE TESTER

Filed June 20, 1947        2 Sheets-Sheet 2

INVENTOR
ARTHUR H. BECKER
BY Henry P. Truesdell
ATTORNEY

Patented Apr. 11, 1950

2,503,992

UNITED STATES PATENT OFFICE 2,503,992

INNER TUBE TESTER

Arthur H. Becker, Indianapolis, Ind., assignor to United States Rubber Company, New York, N. Y., a corporation of New Jersey Application June 20, 1947, Serial No. 756,076

5 Claims. (Cl. 175—183)

This invention relates to a method for testing inner tubes, and in particular it relates to a method for determining leakage of inner tubes for pneumatic tires. More particularly, the invention relates to a method of determining leakage of inner tubes by measuring the electrical conductivity through the wall of the inner tube.

In the manufacture of inner tubes for pneumatic tires, it is customary practice to test each tube to determine whether or not air will leak therefrom. One conventional method of testing inner tubes comprises the steps of inflating the inner tube and submerging the inflated tube in water. If the inner tube leaks, such leakage can be determined visually by the escape of air from the inner tube forming bubbles in the water. While this method of testing inner tubes operates somewhat satisfactorily, it has many objections. For example, the disturbance of the water in which the inner tube is placed frequently makes it difficult to determine leakage, particularly if the extent of leakage is relatively small. Also, relatively small leaks in inner tubes are sometimes incapable of determination by this method. Still further such a method of testing inner tubes is dependent upon close visual inspection which imposes upon the operator a difficult and tedious operation.

In accordance with the practice of the present invention I provide a method of testing inner tubes which includes the steps of coating the interior of the inner tube with an electrically conductive liquid, inflating the tube and immersing it in a tank of water, forming an electrical connection to the interior surface of the walls of the inner tube and to the water in the tank in which the tube is immersed, and measuring the electrical resistance through the wall of the inner tube. Since the conductivity through the wall of the inner tube is relatively high, such conductivity is indicated on a voltmeter and the extent of such an indication determines whether or not the inner tube leaks. If desired, an electric lamp may be used in the circuit which, when lighted, will indicate inner tube leakage.

The walls of the inner tube are normally relatively thin. Consequently, any impurities or foreign matter in the inner tube composition may result in leakage of the inner tube. Sometimes an inner tube is improperly joined in the region of its splice and leakage occurs at this point. Also, the union between the valve stem and the inner tube sometimes results in inner tube leakage. Still further it may occur that a localized area of the inner tube is porous to the extent that leakage is not ordinarily visible by means of the conventional immersion method. Such leakage, however, is readily determined when tested in accordance with the practice of my invention.

It has also been demonstrated that a leaking inner tube, which in service leaks so slow as to drop in pressure from 30 to 29 pounds in a week, can readily be indicated by my invention.

It is, therefore, among the objects of my invention to provide a method of testing inner tubes which is quick and accurate in the determination of leakage of air pressure; to provide a method of testing leakage of inner tubes which have a leakage rate so slow that it is not perceptible by ordinary methods of inspection; and to provide such a method of testing inner tubes which may be performed by simple and efficient equipment.

These and other objects and advantages will appear more fully in the following detailed description when considered in connection with the accompanying drawings, in which:

Figure 1 is a side elevational view, partly in section, of a device for coating an electrically conductive fluid over the inner surface of the wall of an inner tube;

Figure 2 is an elevational view, partly in section and partly diagrammatical, showing a method of immersing an inner tube in water and illustrating the principle of determining the conductivity through the wall of the inner tube;

Figure 3 is a transverse view, in section, of an inner tube at the valve stem and illustrating a connector for forming an electrical contact with the metal portion of the valve stem; and, Figure 4 is an electrical wiring diagram of the testing mechanism constructed in accordance with my invention.

Figure 4:
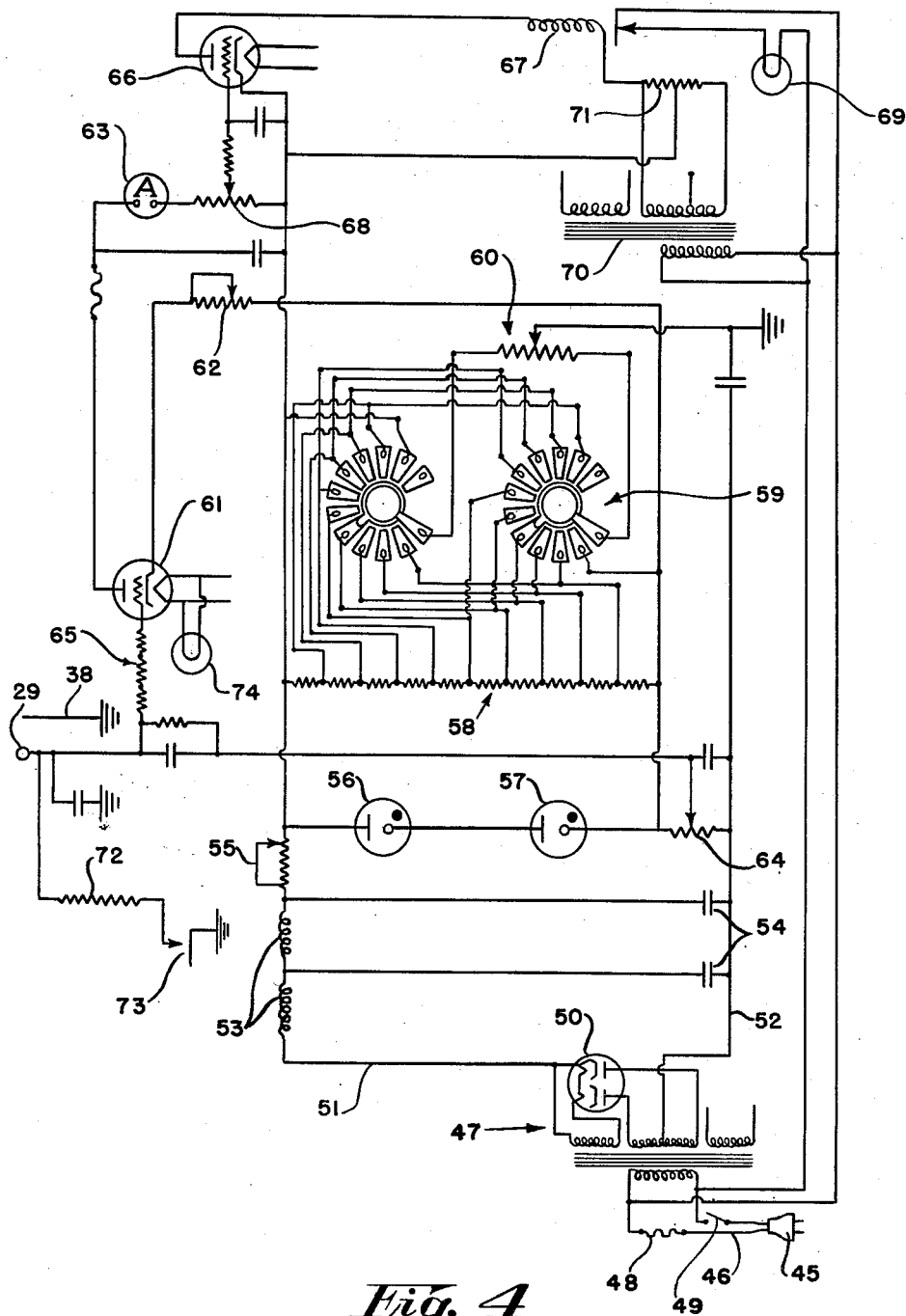

With reference to the drawings, and in particular to Figures 1, 2 and 3, I illustrate one form of practicing my invention. In Figure 1, I show an inner tube I for a pneumatic tire upon which a leak test is to be made. The inner tube I may be in the form of a conventional inner tube for a passenger car tire, or it may be an inner tube for bicycle tires or for heavy service truck or bus tires. It is also to be understood that my invention is not necessarily limited to testing inner tubes for pneumatic tires. The invention is equally applicable for testing hollow articles in which the wall of the article is formed of a material having a relatively low electrical conductivity. An example of such other articles which may be tested in accordance with the practice of my invention are balloons, and bladders for footballs, basketballs, and the like, rubber shoes or gloves.

The inner tube 1 is treated so that the interior surface of the wall of the inner tube is coated with an electrically conductive medium. In order to accomplish this, there is injected into the inner tube a small quantity of a fluid known as "Aqua Rex" which is a sodium salt of sulphate mona esters of a mixture of higher fatty alcohols consisting chiefly of lauryl, miristyl derivatives. A 1% solution of "Aqua Rex" is used. This solution also serves as a wetting agent.

Other liquids having electrically conductive properties may be used in place of the "Aqua Rex." Ordinary tap or well water may be used provided it contains sufficient mineral to render the water slightly conductive. If desired, a small amount of salt, base or acid may be added to the water to increase its conductive properties.

It is merely necessary to place a sufficient quantity of this fluid into the inner tube so as to insure that the entire inner surface of the wall of the inner tube is coated with the fluid. To coat the inner surface of the wall of the tube, the entire chamber of the inner tube may be filled with the solution. Preferably, however, a smaller quantity of the solution may be used and dispersed as by a shaking action until the inner wall is completely wet with the solution. Since it is necessary to remove the solution from the inner tube after the testing operation, it is very advantageous to inject the smallest possible quantity of solution into the tube; otherwise, a great deal of time will be spent simply in removing the excess quantity of the solution. One advantage of using a solution containing a wetting agent is that a thorough wetting of the interior surface of the tube is obtained with very small quantities of the solution. In actual practice I have found that about 1½ ounces of the solution is all that is necessary for this purpose. This quantity is representative for a 6.00–16 inner tube. A quantity of from 1 to 3 ounces is adequate for most sizes of inner tubes, the quantity being increased slightly for the larger size tubes.

After the solution is injected into the inner tube, a conventional valve core is inserted in the valve stem and the tube is inflated with air in approximately the size it assumes within a pneumatic tire.

When this injection procedure is completed, the inflated inner tube may be shook manually so as to disperse the liquid throughout the inner wall of the tube. Preferably, however, the inner tube is placed on an apparatus for automatically shaking the tube. One suitable form of such apparatus is illustrated in Figure 1 of the drawing. The apparatus of Figure 1 operates to rotate the inner tube and to simultaneously shake it up and down to disperse the coating solution within the inner tube.

Essentially the shaking apparatus comprises a drum 2 on which the inner tube rests. A pair of flanges 3 and 4 serve as a guide to maintain the inner tube on the drum. The drum 2 is supported by a shaft 5 adapted for both a rotary movement and for a quick up and down movement so as to transmit a shaking action to the inner tube. Preferably, the shaft 5 is positioned at a slight angle so as to maintain the inner tube in contact with the flange 4. The shaft 5 is supported by bearings 6 and 7 mounted on a plate 8 hinged at 9 to a supporting structure 10. A bracket 11 attached to the plate 8 supports a motor 12 which through a pair of sprockets 13 and 14, and a chain 15, drives the shaft 5. This causes the inner tube 1 to rotate about the drum 2.

In order to provide an up and down motion to the inner tube I provide an eccentric or cam roller 16 keyed to the shaft 5 and adapted to engage in rolling contact with an idler roll 17 supported by the frame 10. As the shaft 5 rotates the eccentric roll 16 causes the shaft 5 to move up and down relative to the frame 10 as limited by the pivot 9.

In order to prevent the inner tube 1 from being thrown off of the drum 2 I provide an arm 18 attached to the bracket 11 and having a projection 19 extending therefrom for the purpose of preventing the inner tube 1 from becoming totally disengaged from the drum. By this arrangement it is merely necessary to drop the inflated tube, having the fluid injected therein, into the position as shown in Figure 1, and after a few revolutions of the inner tube the interior surface of the wall of the inner tube becomes completely coated with the solution. Although Figure 1 illustrates one form of shaking apparatus which has operated well in manufacturing operations, it should be manifest that other apparatus may be used in the practice of my invention such as a tumbling barrel.

After the interior of the tube has been coated, it is removed from the shaking machine and placed in an apparatus for immersing the inner tube in water. One form of a suitable device is illustrated in Figure 2 of the drawing. This consists essentially of a frame 20 adapted to support a tank 21 capable of retaining a sufficient quantity of water 22 into which the inner tube 1 may be completely submerged in a horizontal position. A bracket 23 extending from the frame 20 functions as a support for a vertically operable air cylinder 24. Attached to the piston rod 25 of the cylinder 24 is a spider 26 adaptable for engaging the inner tube 1 and forcing it into a submerged position in the water 22.

In the operation of the apparatus as shown in Figure 2 the spider 26 is normally positioned in its upward position as indicated by the reference character 26A. The inner tube 1 is placed in the water 22 and permitted to float thereon. Before the spider 26 is lowered by the air cylinder, the operator plates an electrical connector 27 in tight engagement with a valve stem 28 projecting from the inner tube 1. When this operation has been completed the operator causes the spider 26 to be lowered for submerging the inner tube 1 by operation of the air cylinder 24.

The electrical connector 27, best shown in Figure 3, comprises essentially a body portion which is formed of electrical insulating material. The connector is joined to an electrical wire 29 having insulation 30 thereon. An aperture 31 is formed in one end of the connector body and a metallic disk 32 fits into the base of the aperture and forms an electrical contact with the wire 29. A wire spring 33 connects with the disk 32 and with a contact 34 slidably positioned with the aperture 31.

The valve stem 28 is formed principally of a rubber composition body having tapered sides and terminates at its end with a metal ferrule 35 bonded to the rubber. The aperture 31 of the connector 27 fits snugly over the taper of the valve stem 28 so that the connector readily remains in position on the valve stem. The path of electrical conductivity now extends from the wire 29 to the disk 32, spring 33, contact 34, and into the ferrule 35. From the ferrule, the path of conductivity continues along the surface of the wall of an aperture 36 extending through the valve stem 28 and along the surface 37 of the interior wall of the inner tube 1. Thus a complete path of electrical conductivity is formed from the wire 29 to the interior wall surface of the inner tube.

In order to provide a water tight seal around the electrical connection between the connector and the valve stem, the body of the connector is preferably constructed of resilient flexible rubber so that it closely grips and seals off the valve stem. In this way, a short circuit through the water bath is prevented. Moreover, the flexible rubber connector will accommodate various sizes and shapes of valve stems.

After the connector 27 is positioned on the valve stem 28, the operator actuates the air cylinder 24 causing the spider 26 to submerge the inner tube into the water 22. The tank 21 is of metal construction and therefore forms a terminal or ground to which an electrical wire 38 is attached. The wires 29 and 38 may now be connected to a battery or other source of electrical energy and in series with a sensitive ammeter 40 or other means for indicating electrical conductivity. By this arrangement there is produced in effect an electrical path on the inside of the inner tube and an electrical path on the outside of the inner tube. In this way the resistance of the wall of the inner tube may be measured and any minute opening through the wall of the inner tube which will complete the path of conductivity through the wall may be readily indicated by the means 40 which measures the resistance.

When an inner tube has been tested the air cylinder 24 is actuated to move the spider 26 into its upward position 26A. The connector 27 is removed from the valve stem 28 and the apparatus is ready for a similar cycle of operation. The liquid is then removed from the interior of the inner tube by connecting the valve stem to a vacuum line.

Between the time when the connector 27 is removed and before it is applied to another inner tube, the connector is dropped into a container 41 supported by a bracket 42 extending from the frame 43. This container 41 is filled with alcohol 43, and the purpose of immersing the adapter 27 in the alcohol 43 is to dissolve the water therefrom to prevent a direct path of electrical conductivity from the metal ferrule 35 on the valve stem to the water in the tank. Instead of using an alcohol bath the connector may be dried by means of an air jet.

It is to be understood that the wiring diagram as shown in Figure 2 is intended to illustrate the principle of the operation of the electrical indicating means. For practical purposes, however, it is essential to use sensitive electrical apparatus for detecting and amplifying the small amount of current that may pass through the inner tube wall. Therefore, reference may be had to Figure 4 which illustrates one form of electrical apparatus and circuit for indicating variations in the electrical resistivity of the inner tube wall.

The operation of the electrical unit as shown in Figure 4 is based on the principle of measuring very low conductivity, by using a sensitive vacuum tube resistance measuring unit for measuring very high resistance.

The measuring unit employs 115–120 volt alternating current tapped from a supply line by means of an ordinary plug connector 45. A line 46 carries the current to a power transformer 47 thru a five ampere fuse 48. Power switch 49 turns the unit on and off. The secondary of the power transformer 47 furnishes several different voltages, including 6.3 volts and 800 volts center tapped. Associated with the transformer 47 is a vacuum tube 50 which is a full wave high vacuum rectifier with an open filament type cathode. This tube rectifies the A. C. voltage furnished by the power transformer 47 and supplies a control voltage of 340 volts across supply lines 51 and 52.

Lines 51 and 52 extend from the rectifier and transformer and include within their circuit chokes 53 of approximately 6–8 henries and condensers 54 of approximately 10 mfd. which comprise a filter section for smoothing out the rectified wave. Also, in line 51 is a voltage reducing resistor 55 of approximately 5000 ohms—25 watt rating. Ordinarily, the voltage passing through lines 51 and 52 may be unstable due to line voltage variations which would cause a failure of operation. This condition is corrected by incorporating, in series, across the lines 51 and 52 voltage regulator tubes 56 and 57 the purpose of which is to regulate the voltage from the rectifier tube 50. The resistor 55 is adjusted so that a direct current milliammeter when connected in series with the regulator tubes 56 and 57 will indicate a current reading of 12 milliamperes. The regulator tubes 56 and 57 are of the cold cathode gas filled type.

There is a potential of 265 volts across tubes 56 and 57 due to the voltage drop in a 3000 ohm potentiometer 64. This voltage is fed across a resistance bank 58 consisting of ten 2000 ohm 2 watt resistances. Leads taken from these resistors go to a selector switch 59. This is a two-gang eleven point switch which selects any one of the ten resistors in bank 58 and connects it in shunt with a 10,000 ohm potentiometer 60. The selector switch 59 is the coarse control, and the potentiometer 60 is the fine control of a positive voltage applied to the grid of a control tube 61 through the grounded center tap of potentiometer 60, grounded lead 38, the inner tube being tested, and the test lead 29. The purpose of the selector switch 59 and potentiometer 60 is to permit adjustment of the positive voltage in accordance with variations in the resistance of the particular rubber stock of which the inner tube is made. The manner in which the positive voltage controls operation of tube 61 will be hereinafter described.

Tube 61 is a triode amplifier tube used to control the current to a meter of 500 microamperes rating. The 3000 ohm potentiometer 64 is center tapped and controls the grid bias of tube 61 through a 512 megohm resistor bank 65. With 265 volts on the plate of this tube a grid bias of about 18 volts is necessary to stop the flow of current through the tube and the microammeter. The 3000 ohm potentiometer 64 is a zero bias control to stop conduction of tube 61 and bring the pointer of microammeter 63 to zero. Additional negative bias is furnished by the resistor 62 in the cathode circuit when the tube is conducting upon testing a tube. The arrangement of the grid in the circuit is sometimes referred to as a "floating grid."

A small amount of positive potential can reach the grid through the 512 megohm resistance 65 when a conducting path is made from potentiometer 60 through the ground, leads 38 and 29 and the inner tube being tested. This small amount of positive potential going to the grid of tube 61 offsets the zero bias, and lets a small amount of current flow through the tube and meter. It is necessary to have about 62.5 volts across the resistor bank 65 to put 18 volts bias on tube 61.

Tube 66 is a relay tube with the same characteristics as tube 61. The purpose of this tube is to control a relay 67. The grid of tube 66 is biased with a 75,000 ohm potentiometer 68 which is in series with meter 63 and the plate of control tube 61. By adjusting potentiometer 68 the grid bias of the relay tube may be controlled to vary the operation of the relay in relation to the reading on meter 63. When no current is flowing through this meter circuit, there is no bias on the relay tube and current flows through the plate and relay circuit 67. This maintains a switch on the relay in open position and a signal light 69 is out. As seen by the diagram this light is operated off the line voltage. When current does flow through the meter circuit the grid of the relay tube is biased negatively causing a cut-off of plate current in the tube, and allowing the switch on the relay to drop shut thereby turning on the signal light 69. A relay transformer 70 furnishes cathode heater and plate current to the relay tube 66. This current is controlled by an 80,000 ohm potentiometer 71.

A precision 2 megohm resistor 72 is connected into the grid circuit of the control tube 61. Push switch 73 connects this resistor to ground when it is desired to test the unit and adjust it for proper operation. This resistor should approximately equal the resistance of an automobile inner tube that leaks. Therefore, pushing switch 73 simulates this condition and is a test of proper unit operation. After potentiometer 64 is adjusted to stop conduction of tube 61 and bring the reading of meter 63 to zero, switch 73 is closed to place the resistance 72 in the grid circuit. Positive potential is thus applied to the grid from potentiometer 60 through the ground lead, switch 73 and resistor 72. Potentiometer 60 is adjusted to give a reading of approximately 250 microamperes which corresponds to a reading for a defective inner tube. This means that when a leaky inner tube is placed across leads 38 and 29, a reading of approximately 250 microamperes is obtained. On the other hand, if a satisfactory tube is placed across these leads, no appreciable meter reading will be obtained since the resistance of the inner tube is high enough to prevent conduction of tube 61. Any slight positive voltage applied to the grid through the high resistance of the inner tube, may cause the tube 61 to conduct slightly but the resistance 62 will then function to apply additional negative bias to return the tube to substantially non-conductive condition.

Panel light 74 is a 6.3 volt light to indicate unit operation. When switch 49 is on, this light will burn indicating the unit is ready for use.

In actual practice inner tubes which are tested on this apparatus ordinarily have an electrical resistance, through the wall of the tube ranging in value from 3 to 20 megohms. If such a tube should leak, the combined resistance of the tube and leakage path drops to from 0.4 to 3 megohms. Approximately 2 megohms is an average resistance of a leaky tube. In order to measure this differential, the circuit employed operates at a current of approximately $\frac{1}{10}$ microampere and at a voltage of approximately 50 volts, as measured at the test leads. In the ordinary testing of inner tubes by this method, a reading on the ammeter 63 of less than approximately 250 microamperes is representative of an inner tube which does not leak. If the indication on the meter 63 is equivalent to or higher than 250 amperes then the inner tube does leak and it is thereafter classified as such. As a further visual aid in the determination of whether or not a tube leaks, the electric lamp 69 is included in the circuit so as to flash on in the event the ammeter 63 indicates a current approximating or higher than 250 microamperes.

As thus shown and described, I have provided a novel method for the determination of leaks in inner tubes, which method is readily applicable for commercial inspection of production inner tubes, and which is capable of determining inner tube leakage with a higher degree of accuracy than has been heretofore possible by conventional means of visual inspection.

While I have shown a preferred apparatus for performing my invention it is to be understood that it is susceptible of those modifications which appear obviously within the spirit of my invention and as appearing in the scope of the appended claims.

Having thus described my invention what I claim and desire to protect by Letters Patent is:

1. The method of testing an inflatable article for determination of its air retention properties comprising the steps, introducing a quantity of electrically conductive liquid within the article, inflating the article with air, agitating the article to disperse the liquid within the article to at least wet the entire interior wall surface of the article, submerging the article in an electrically conductive liquid, and measuring an electrical characteristic of the wall of the article through the conductive path formed by the internal and external electrically conductive liquids.

2. The method of testing inner tubes having a valve stem comprising the steps, introducing a quantity of electrically conductive liquid into the inner tube through the valve stem, dispersing the liquid within the tube to wet the interior surface of the tube, forming an electrical connection with the valve stem, submerging the inner tube in an electrically conductive liquid, forming a second electrical connection with the liquid externally of the inner tube, and measuring the electrical resistance of the wall of the inner tube through the medium of the internal and external electrically conductive liquids.

3. The method of testing inner tubes having a valve stem comprising the steps, introducing a quantity of electrically conductive liquid into the inner tube through the valve stem, agitating the inner tube to disperse the liquid therein to at least wet the entire interior wall surface of the inner tube, forming an electrical connection with the valve stem, submerging the inner tube in an electrically conductive liquid, forming a second electrical connection with the liquid externally of the inner tube, and measuring the electrical resistance of the wall of the inner tube through the medium of the internal and external electrically conductive liquids.

4. The method of testing inner tubes having a valve stem comprising the steps, introducing a quantity of electrically conductive liquid into the inner tube through the valve stem, inflating the inner tube with air to the extent of approximately its normal inflatable size, agitating the inner tube to disperse the liquid therein to at least wet the entire interior wall surface of the inner tube, forming an electrical connection with the valve stem, submerging the inner tube in an electrically.

conductive liquid, forming a second electrical connection with the liquid externally of the inner tube, and measuring the electrical resistance of the wall of the inner tube through the conductive path formed by the internal and external electrically conductive liquids.

5. The method of testing inner tubes having a valve stem with a non-metallic body portion and a metal insert joined with the end of the stem comprising the steps, introducing a quantity of electrically conductive liquid into the inner tube to coat the interior surface thereof, forming an electrical connection with the metal insert of the valve stem while completely electrically insulating the metal insert exteriorly of its connection, inflating the inner tube with a gaseous medium submerging the inner tube in an electrically conductive liquid, forming a second electrical connection with the liquid externally of the inner tube, and measuring the electrical resistance of the wall of the inner tube through the medium of the internal and external electrically conductive liquids.

ARTHUR H. BECKER.

REFERENCES CITED

The following references are of record in the file of this patent:

UNITED STATES PATENTS

| Number | Name | Date |
| --- | --- | --- |
| 2,297,837 | Loughnane | Oct. 6, 1942 |

OTHER REFERENCES

Electrical World, January 12, 1924, page 98, article by Nelson.

Electrical World, March 12, 1927, page 561, article by Macentyre.